UNITED STATES PATENT OFFICE.

MAX HESSENLAND, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

VAT DYESTUFFS OF THE ANTHRAQUINONE SERIES AND PROCESS OF MAKING SAME.

1,047,940.   Specification of Letters Patent.   Patented Dec. 24, 1912.

No Drawing.   Application filed December 23, 1911. Serial No. 667,523.

*To all whom it may concern:*

Be it known that I, MAX HESSENLAND, Ph. D., chemist, a citizen of the Empire of Germany, residing at Höchst-on-the-Main, Germany, have invented certain new and useful Improvements in New Vat Dyestuffs of the Anthraquinone Series and Processes of Making Same, of which the following is a specification.

I have found that valuable dyestuffs are obtained by heating with caustic alkalis the acridones derived from dianthraquinonylamins.

The new dyestuffs are dark powders, insoluble in water, alcohol, ether and benzene, soluble in concentrated sulfuric acid with a brown to violet color; they dissolve in alkaline hydrosulfite with a brown color, and dye cotton gray to greenish-brown tints of great fastness.

Example: 150 parts of caustic potash are fused at 170–180° and there are gradually added, while stirring, 15 parts of 1-anthraquinonyl - 4 - aminoanthraquinone - 1.2 - acridone obtained by combining 4-aminoanthraquinone-1.2-acridone with 1-chloranthraquinone (see U. S. Patent No. 1,002,270). The temperature is allowed to rise to 210° C. while stirring; the product of the reaction agglomerates and separates itself from the melt. It is dissolved in water and then the dyestuff is isolated by passing a current of air into the solution, or by the addition of an oxidizing agent. It forms a blackish-brown powder, insoluble in the usual solvents such as alcohol, ether, benzene or the like. When recrystallized from α-chlornaphthalene, it dissolves in concentrated sulfuric acid with a reddish-violet color. The dyestuff yields with alkaline hydrosulfite a brown vat which dyes cotton olive-brown tints of excellent fastness. In an analogous manner, similar dyestuffs can be obtained from other acridones derived from dianthraquinonylamins, which may be synthesized in an analogous manner to that above mentioned.

Having now described my invention, what I claim is:

1. The process of manufacturing new vat dyestuffs, which consists in heating with caustic alkalis the acridones derived from dianthraquinonylamins.

2. As new products, the specified vat dyestuffs, derivatives of anthraquinonylaminoanthraquinone - 1.2 - acridones, obtainable by heating with a caustic alkali the acridones derived from dianthraquinonylamins, being dark powders, insoluble in water, alcohol, benzene, soluble in concentrated sulfuric acid with a brown to violet color, yielding when treated with alkaline hydrosulfite brown vats which dye cotton gray to greenish-brown tints.

3. As a new product, the specified vat dyestuff, a derivative of 1-anthraquinonyl-4-aminoanthraquinone-1.2-acridone, obtainable by heating with a caustic alkali the 1 - anthraquinonyl - 4 - aminoanthraquinone - 1.2-acridone, being a blackish-brown powder, insoluble in water, alcohol, benzene, dissolving in concentrated sulfuric acid after recrystallization from α-chlornaphthalene with a reddish-violet color, yielding when treated with alkaline hydrosulfite a brown vat which dyes cotton olive-brown tints of great fastness.

In testimony whereof, I affix my signature in presence of two witnesses.

MAX HESSENLAND.

Witnesses:
 JEAN GRUND,
 CARL GRUND.